United States Patent
Kim et al.

(10) Patent No.: US 7,646,800 B2
(45) Date of Patent: Jan. 12, 2010

(54) METHOD AND APPARATUS FOR ALLOCATING SUBCARRIERS IN A BROADBAND WIRELESS COMMUNICATIONS SYSTEM USING MULTIPLE CARRIERS

(75) Inventors: Jeong-Heon Kim, Anyang-si (KR); Jao-Ho Jeon, Seongnam-si (KR); Soon-Young Yoon, Seoul (KR); Seung-Joo Maeng, Seongnam-si (KR); In-Seok Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 840 days.

(21) Appl. No.: 11/074,043

(22) Filed: Mar. 7, 2005

(65) Prior Publication Data

US 2005/0195910 A1    Sep. 8, 2005

(30) Foreign Application Priority Data

Mar. 5, 2004    (KR)    ............ 10-2004-0015985

(51) Int. Cl.
- *H04B 1/00* (2006.01)
- *H04W 72/00* (2009.01)
- *H04L 12/28* (2006.01)

(52) U.S. Cl. ............... 375/135; 455/450; 370/431

(58) Field of Classification Search ......... 375/135, 375/260, 267, 132; 455/450, 452, 452.1, 455/446, 447, 449, 522, 422.1; 370/336, 370/208, 281, 295, 329, 330, 341, 343, 344, 370/431, 436, 478, 480, 481

See application file for complete search history.

(56) References Cited

U.S. PATENT DOCUMENTS

| | | | |
|---|---|---|---|
| 6,269,245 B1 * | 7/2001 | Li et al. | 455/450 |
| 6,904,283 B2 * | 6/2005 | Li et al. | 455/450 |
| 7,146,172 B2 * | 12/2006 | Li et al. | 455/452.1 |
| 7,164,669 B2 * | 1/2007 | Li et al. | 370/336 |
| 7,224,741 B1 * | 5/2007 | Hadad | 375/260 |
| 7,418,043 B2 * | 8/2008 | Shattil | 375/260 |
| 7,502,310 B2 * | 3/2009 | Hwang et al. | 370/208 |
| 2001/0046868 A1 * | 11/2001 | Liu et al. | 455/452 |
| 2002/0119781 A1 * | 8/2002 | Li et al. | 455/450 |
| 2004/0190640 A1 * | 9/2004 | Dubuc et al. | 375/260 |
| 2005/0013279 A1 * | 1/2005 | Hwang et al. | 370/343 |
| 2005/0201476 A1 * | 9/2005 | Kim et al. | 375/260 |
| 2006/0072649 A1 * | 4/2006 | Chang et al. | 375/132 |
| 2007/0263743 A1 * | 11/2007 | Lee et al. | 375/267 |
| 2008/0039107 A1 * | 2/2008 | Ma et al. | 455/450 |
| 2009/0141681 A1 * | 6/2009 | Hwang et al. | 370/329 |

FOREIGN PATENT DOCUMENTS

| | | |
|---|---|---|
| CN | 1160956 | 11/1997 |
| JP | 2007-510354 | 4/2007 |

(Continued)

*Primary Examiner*—Tesfaldet Bocure
*Assistant Examiner*—Lawrence B Williams
(74) *Attorney, Agent, or Firm*—The Farrell Law Firm, LLP

(57) ABSTRACT

A method and apparatus for allocating subcarriers in a broadband wireless communication system using multiple carriers are provided. In the wireless communication system where the total available frequency band is divided into a plurality of subcarriers and subchannels each are formed with a predetermined number of subcarriers, the subcarriers are grouped into subcarrier groups, subcarriers are selected from the subcarrier groups according to predetermined sequences, and the selected subcarriers are allocated as a subchannel to a cell in a predetermined time period.

33 Claims, 5 Drawing Sheets

FOREIGN PATENT DOCUMENTS

| | | |
|---|---|---|
| JP | 2007-525928 | 9/2007 |
| RU | 2119255 | 9/1998 |
| WO | WO 97/01256 | 1/1997 |
| WO | WO 2005/043854 | 5/2005 |
| WO | WO 2005/086384 | 9/2005 |
| WO | WO 2005/022792 A2 * | 10/2005 |

* cited by examiner

METHOD AND APPARATUS FOR ALLOCATING SUBCARRIERS IN A BROADBAND WIRELESS COMMUNICATIONS SYSTEM USING MULTIPLE CARRIERS

PRIORITY

This application claims priority under 35 U.S.C. §119 to an application entitled "Method and Apparatus for Allocating Subcarriers in a Broadband Wireless Communication System Using Multiple Carriers" filed in the Korean Intellectual Property Office on Mar. 5, 2004 and assigned Serial No. 2004-15985, the contents of which are incorporated herein by reference.

BACKGROUND OF THE INVENTION

1. Field of the Invention

The present invention relates generally to a method of allocating communication resources in a broadband wireless communication system, and in particular, to a method and apparatus for allocating subcarriers in a broadband wireless communication system using multiple carriers.

2. Description of the Related Art

The first MCM (Multi-Carrier Modulation) systems appeared in the late 1950's for military high frequency radio communication. OFDM (Orthogonal Frequency Division Multiplexing), a special case of MCM with overlapping orthogonal subcarriers, was initially developed in the 1970's. With OFDM, a serial symbol sequence is converted to parallel symbol sequences and modulated to mutually orthogonal subcarriers before transmission. Because of difficulty in orthogonal modulation between multiple carriers, OFDM has limited practical application to communication systems.

However, in 1971, Weinstein, et. al. proposed an OFDM scheme that applies DFT (Discrete Fourier Transform) to parallel data transmission as an efficient modulation/demodulation process, thereby creating a driving force for OFDM development. In addition, the introduction of a guard interval further reduced adverse effects of multi-path propagation and delay spread in communication systems. Although complex hardware created an obstacle to the widespread use of OFDM, recent advances in digital signal processing technology including FFT (Fast Fourier Transform) and IFFT (Inverse Fast Fourier Transform) have enabled practical OFDM implementation.

OFDM can be implemented for digital data communications such as DAB (Digital Audio Broadcasting), digital TV broadcasting, WLAN (Wireless Local Area Network), and W-ATM (Wireless Asynchronous Transfer Mode). OFDM also exhibits high frequency use efficiency, reduces effects of ISI (Inter-Symbol Interference) by guard intervals, and is robust against multi-path fading. Therefore, OFDM provides optimum transmission efficiency for high-speed data transmission.

OFDM-based multiple access techniques are divided into OFDMA (Orthogonal Frequency Division Multiple Access) and FH (Frequency Hopping)-OFDM. FH-OFDM is a combination of FH and OFDM. Both OFDMA and FH-OFDM commonly seek to achieve frequency diversity gain by distributing data tones across the total frequency band. OFDMA is a scheme of transmitting each OFDM symbol across a plurality of subcarriers that form one subchannel.

OFDMA applications for broadband wireless communication systems include systems defined in the IEEE 802.16a and IEEE 802.16e standards. Such OFDMA systems adopt a 2048-point FFT, for example that divides 1702 tones into 166 pilot tones and 1536 data tones. The 1536 data tones are further divided into 32 subchannels for allocation to users, each subchannel including 48 data tones. OFDMA is a multiple access technique where the frequency domain is divided into subchannels, each having a plurality of subcarriers. The time domain is divided into a plurality of time slots, and the subchannels are allocated to users.

The IEEE 802.16a or IEEE 802.16e system divides a broad frequency band of 10-MHz into subchannels on the frequency domain only. About 1600 to 1700 subcarriers are allocated to one OFDM symbol using 2048 points FFT. Thus, the number of cells can be increased depending on subcarrier allocation. Yet, only about 40 cells are identifiable when subchannels are formed by subcarrier allocation in the prior art, considering collision between channels in a multi-cell environment. To facilitate deployment of a broadband wireless network, the number of identifiable cells should be about 100. In this context, a conventional subchannel/subcarrier allocation method in an OFDMA scheme is limited in the number of cells it can service.

SUMMARY OF THE INVENTION

An object of the present invention is to substantially solve at least the above problems and/or disadvantages and to provide at least the advantages below. Accordingly, an object of the present invention is to provide a method and apparatus for allocating subcarriers to increase cells in number in a broadband wireless communication system using multiple carriers.

Another object of the present invention is to provide a method and apparatus for allocating subcarriers to reduce collision between subchannels in a broadband wireless communication system using multiple carriers.

The above objects are achieved by providing a method and apparatus for allocating subcarriers in a broadband wireless communication system using multiple carriers.

According to one aspect of the present invention, in a method of allocating a plurality subcarriers into a subchannel in a wireless communication system where a mobile station and a base station communicates with each other through the at least one subchannel, subcarriers of a cell are grouped into a plurality of subcarrier groups, each of the plurality including at least one successive subcarrier, and a plurality of the subcarriers are allocated into a subchannel by selecting one subcarrier from the each subcarrier group using a cell identification information, a plurality of Reed-Solomon sequences and information related with the subcarrier groups.

According to another aspect of the present invention, in an apparatus for allocating a plurality subcarriers into a subchannel in a wireless communication system where a mobile station and a base station communicates with each other through the at least one subchannel, a subcarrier group generator groups subcarriers of a cell into a plurality of subcarrier groups, each of the plurality including at least one successive subcarrier, a cell separator generates a sequence for cell identification using cell identification information and a plurality of Reed-Solomon sequences, and a subcarrier allocator allocates a plurality of the subcarriers into a subchannel using the sequence for cell identification and information related with the subcarrier groups.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
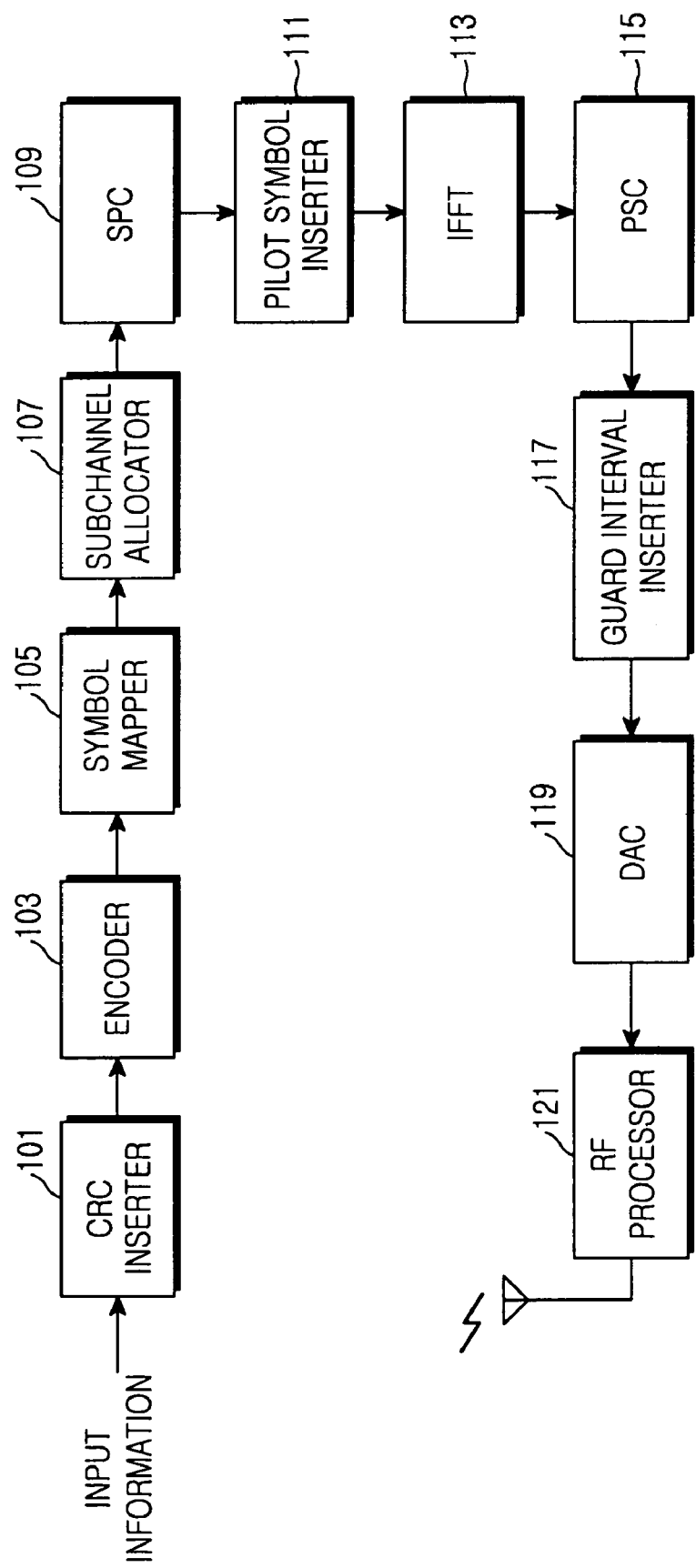
FIG. 1 is a block diagram of a transmitter in an OFDMA communication system according to an embodiment of the present invention.

FIG. 1 is a block diagram of a transmitter in an OFDMA communication system according to an embodiment of the present invention. Referring to FIG. 1, the transmitter includes a CRC (Cyclic Redundancy Check) inserter 101 for generating CRC bits by which transmission errors are checked, an encoder 103 for encoding data bits, a symbol mapper 105 for carrying out symbol modulation in a predetermined modulation scheme, and a subchannel allocator 107 for allocating subchannels to users using cell identification sequences and subchannel sequences in a manner that maximizes the number of identifiable cells, described later in detail.

The transmitter further includes a serial-to-parallel converter (SPC) 109 for converting serial modulated symbols to parallel signals, a pilot symbol inserter 111, an IFFT 113 for IFFT-processing the parallel modulated signals of the subchannels, a parallel-to-serial converter (PSC) 115 for converting the parallel modulated signals to a serial symbol sequence, a guard interval inserter 117 for inserting a guard interval into the serial symbol sequence, a digital-to-analog converter (DAC) 119, and an RF (Radio Frequency) processor 121.

In operation, upon generation of user data bits and control data bits (hereinafter, collectively referred to as information data bits) for transmission, the CRC inserter 101 inserts CRC bits into the information data bits and the encoder 103 encodes the output of the CRC inserter 101 according to a predetermined coding method which may include turbo coding or convolutional coding with a predetermined code rate.

The symbol mapper 105 modulates the coded bits into symbols according to the predetermined modulation scheme, such as QPSK (Quadrature Phase Shift Keying) or 16QAM (Quadrature Amplitude Modulation). The subchannel allocator 107 then allocates a subchannel to the modulated symbols.

Subchannel allocation is performed using a cell identification sequence and a subchannel sequence according to an embodiment of the present invention, as described later in detail. The SPC 109 parallelizes the serial modulated symbols to which the subchannel and its corresponding frequency band have been allocated. The pilot inserter 111 then inserts pilot symbols into the parallel modulation symbols.

Next, the IFFT 113 performs an N-point IFFT on the output signal of the pilot symbol inserter 111. The PSC 115 then converts the IFFT signals into a serial signal. The guard interval inserter 117 inserts a predetermined guard interval into the serial signal. The guard interval is used to eliminate interference between the previous OFDM symbol transmitted in the previous OFDM symbol time and the current OFDM symbol transmitted in the current OFDM symbol time when transmitting an OFDM symbol sequence.

The DAC 119 converts the output of the guard interval inserter 117 to an analog signal. The RF processor 121, including a filter and a front end unit, processes the analog signal to an RF signal transmittable over the air and transmits the RF signal to a radio network via a transmit (Tx) antenna 123.

Subchannel allocation according to an embodiment of the present invention takes place in the subchannel allocator 107 that increases the number of identifiable cells by use of the subchannel allocator 107.

Before describing the subchannel allocating method of the present invention, a channel structure for the OFDMA communication system to which the present invention is applied will be described briefly.

The OFDMA communication system transmits parallel transmission data across a plurality of mutually orthogonal subcarriers. The subcarriers include data subcarriers for delivering data and pilot subcarriers for channel estimation. One subchannel includes a plurality of subcarriers. The subchannel is a basic unit of serving one subscriber, and each subscriber transmits/receives data on at least one subchannel.

Therefore, in the case where one subscriber occupies one subchannel, the OFDMA communication system can accommodate as many subscribers as available subchannels. Each subcarrier is labeled with an index or subcarrier index indicating the logical position of the subcarrier. With this channel structure, the number of cells defined within each base station and inter-cell interference can be controlled by allocating subcarriers to subchannels appropriately in terms of subcarrier position.

In accordance with an embodiment of the present invention, subcarriers are indexed using an error correction code called a Reed-Solomon Sequence (RS Seq), and then allocated in relation to their logical positions so as to minimize collision between subchannels. The RS Seq is a coding method that allows multiple error correction in high-speed data transmission. The basic principle of the RS Seq is well known and thus its description is not provided herein.

Figure 2:
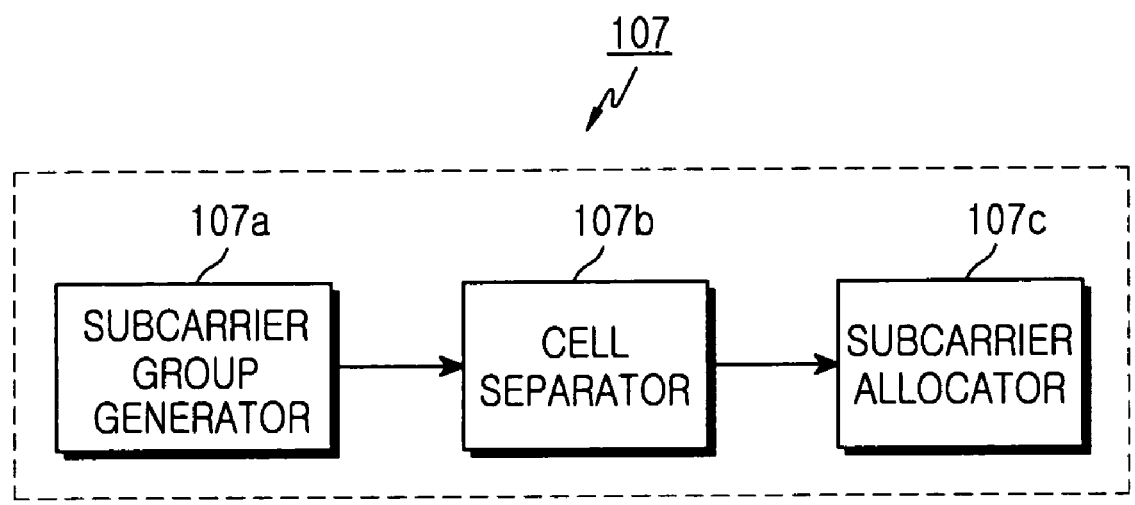
FIG. 2 is a block diagram of a subcarrier allocating apparatus in a broadband wireless communication system using multiple carriers according to an embodiment of the present invention.

FIG. 2 is a block diagram of a subcarrier allocating apparatus in a broadband wireless communication system using multiple carriers according to an embodiment of the present invention. The subcarrier allocating apparatus is implemented as the subchannel allocator 107 of FIG. 1 including a subcarrier group generator 107a, a cell separator 107b, and a subcarrier allocator 107c.

Referring to FIG. 2, the subcarrier group generator 107a groups subcarriers of a cell into a plurality of subcarrier groups, each of the plurality including at least one successive subcarrier. The subcarrier grouping will be described later with reference to FIG. 3. The cell separator 107b generates a sequence for cell identification using cell identification information and a plurality of Reed-Solomon sequences. The subcarrier allocator 107c allocates a plurality of the subcarriers into a subchannel using the sequence for cell identification and information related with the subcarrier groups.

In accordance with the present invention, the cell identification sequences are so designed that given Q successive subcarriers in each subcarrier group, $Q^2$ cells can be identified. In addition, subchannel sequences are designed to allocate up to Q subchannels in a cell.

Therefore, the numbers of identifiable cells and subchannels available to the entire cells can be raised to the second power of those available with conventional technology.

Hereinafter, the subcarrier allocation method, the cell identification sequences, and the subchannel sequences according to an embodiment of the present invention will be described in detail.

Figure 3:
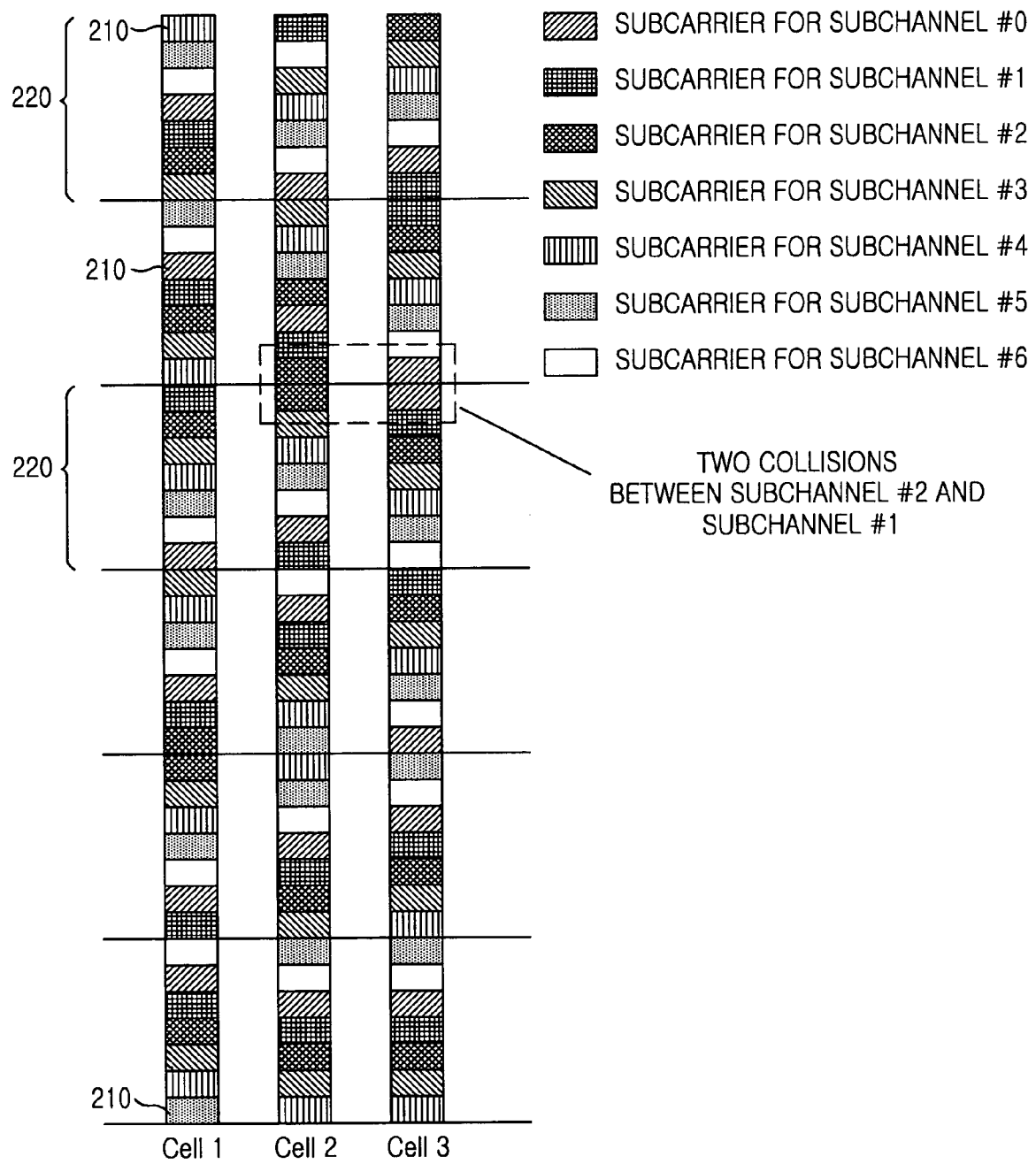
FIG. 3 illustrates a method of allocating subcarriers in the broadband wireless communication system using multiple carriers according to an embodiment of the present invention.

FIG. 3 illustrates the subcarrier allocation method in the broadband wireless communication system using multiple carriers according to an embodiment of the present invention.

Referring to FIG. 3, total subcarriers 210 allocated to one cell are grouped into (Q−1) subcarrier groups 220, each group including Q successive subcarriers 210. An RS Seq indicating the logical positions of subcarriers is defined over a Galois Field, GF(Q). GF(Q) is closed for certain operations and has Q elements $\{0, 1, 2, \ldots, Q-1\}$. If GF(Q) is closed for a specific operation, the result of the operation falls within the same GF(Q).

When Q is a prime number, addition and multiplication over GF(Q) are defined by Equation (1):

$$a+b=(a+b) \bmod Q$$
$$a,b \in \{0, 1, 2, \ldots, Q-1\} \quad (1)$$

and Equation (2):

$$a*b=(a*b) \bmod Q$$
$$a,b \in \{0, 1, 2, \ldots, Q-1\} \quad (2)$$

where the operator "mod" represents modulation.

In a preferred embodiment of the present invention, GF(Q) is closed for the addition and multiplication defined as Equation (1) and Equation (2). A cell identification sequence $S_m$ (m is a cell number) defined over GF(Q) is a sequence determined by the specific cell number, for use in determining the logical positions of subcarriers 210 for each subchannel. In accordance with the preferred embodiment, a subchannel sequence $S_{m,\beta}$ is generated using the cell identification sequence and a parameter $\beta$ for each subchannel to determine the subcarriers positions for each subchannel. (Q−1) subcarriers 210 selected from the different subcarrier groups 220 preferably form one subchannel (Q=7 in FIG. 3). It should be noted that the number of the subcarriers 210 per subchannel may increase or decrease.

According to an embodiment of the present invention, a subcarrier index is determined by Equation (3):

$$\text{Sub\_carrier}(i) = Q*i + S(i) \quad (3)$$

where Sub_carrier(i) is the subcarrier index, i is the index or group index of a subcarrier group 220, and S(i) is an (i+1)th element of the subchannel sequence $S_{m,\beta}$, representing a subcarrier 210 in the subcarrier group 220. The group index i=0, 1, ..., Q−2. Once $S_{m,\beta}$ is defined, a subchannel is defined for a cell.

For example, if a total of 42 subcarriers 210 labeled with subcarrier indexes $\{0, 1, 2, \ldots, 41\}$ are grouped into six subcarrier groups 220, as illustrated in FIG. 3, six subcarriers 210 for one of subchannel #0 to subchannel #6 can be determined using a subchannel sequence $S_{m,\beta}$ of length 6. Given $S_{m,\beta}=\{3, 2, 6, 4, 5, 1\}$, $\{7*0+3, 7*1+2, \ldots, 7*5+1\}$ are computed for subcarrier index i=0, 1, ..., 5 in each subchannel, by Eq. (3). Thus, the subchannel is made up of subcarriers with indexes $\{3, 9, 20, 25, 33, 36\}$.

Hereinbelow, the cell identification sequence $S_m$ and the subchannel sequence $S_{m,\beta}$ will be described in detail.

The present invention preferably defines the cell identification sequence $S_m$ using cell identification information and a plurality of sequences. The cell identification information can be a cell ID for example, and the plurality of sequences are base sequences $S_0$ and $S_1$ defined in the present invention. While more base sequences can be defined, the following description is made with two base sequences.

The base sequences S0 and S1 are defined in Equation (4) as:

$$S0=\{1, a, a^2, a^3, \ldots, a^{Q-2}\}$$
$$S1=\{1, a^2, a^4, a^6, \ldots, a^{2(Q-2)}\}$$
$$(a^m \neq 1 \text{ for } m<Q-1) \quad (4)$$

where a is a primitive element of GF(Q). For Q=7, $a^6 \bmod 7=1$ and thus a=3, an element of GF(Q). Thus, $$S0=\{3, 3^2, 3^2, 3^4, 3^5, 3^6\} \bmod 7 = \{3, 2, 6, 4, 5, 1\} \text{ and}$$

$$S1=\{3^2, 3^4, 3^6, 3^2, 3^4, 3^6\} \bmod 7 = \{2, 4, 1, 2, 4, 1\}$$

The elements of these base sequences can be cyclically shifted.

The cell identification sequence $S_m$ for an $m^{th}$ cell is given in Equation (5) as:

$$S_m = c_0 * S0 + c_1 * S1 \quad (5)$$
$$= \{c_0 a + c_1 a^2, c_0 a^2 + c_1 a^4, \ldots, c_0 a^{Q-1} + c_1 a^{2(Q-1)}\}$$

where it can be defined that $m=c_0+Qc_1$. The quotient and remainder of m mod Q are $c_1$ and $c_0$, respectively. Here, m denotes the cell identification information, that is, the cell number (cell ID). $c_0$ and $c_1$ are cell identification factor and can substitute into each other.

For example, when Q=7, $c_0$ and $c_1$ each range from 0 to 6. The number of all possible combinations of $c_0$ and $c_1$ is $Q^2$ since Q values are available for each of $c_0$ and $c_1$, hence, for Q=7, 49 cells can be separated. Hence, according to Eq. (5), $Q^2$ cells can be separated.

The subchannel sequence $S_{m,\beta}$ used to set subchannels for the mth cell is computed by adding a predetermined offset $\beta$, as shown in Equation (6):

$$S_{m,\beta} = S_m + \{\beta, \beta, \beta, \ldots, \beta, \beta\}$$
$$\beta \in GF(Q) \quad (6)$$

where $\beta$ ranges from 0 to (Q−1). Hence, up to Q subchannels can be allocated to one cell.

According to the above-described method, up to $Q^2$ cells can be identified using the cell identification sequence $S_m$ defined as Equation (5) and up to Q subchannels can be allocated to one cell using the subchannel sequence $S_{m,\beta}$ defined as Equation (6). Consequently, the total number of subchannels available to the entire cells is up to $Q^3$.

The thus-derived cell identification sequence performs so well that at most two collisions may occur between adjacent cells. If $c_1=0$ for every cell in Equation (5) (i.e. the number of cells is kept at the conventional level), $S_m$ becomes a typical RS Seq. In this case, at most one collision occurs between adjacent cells.

Table 1 below lists a plurality of subchannel sequences for a base station cell with m=1 (i.e. $c_0=1$, $c_1=0$), for example.

TABLE 1

| | | | | | | |
|---|---|---|---|---|---|---|
| $S_{1,0}$ | 3 | 2 | 6 | 4 | 5 | 1 |
| $S_{1,1}$ | 4 | 3 | 0 | 5 | 6 | 2 |
| $S_{1,2}$ | 5 | 4 | 1 | 6 | 0 | 3 |
| $S_{1,3}$ | 6 | 5 | 2 | 0 | 1 | 4 |
| $S_{1,4}$ | 0 | 6 | 3 | 1 | 2 | 5 |
| $S_{1,5}$ | 1 | 0 | 4 | 2 | 3 | 6 |
| $S_{1,6}$ | 2 | 1 | 5 | 3 | 4 | 0 |

Table 2 illustrates cell identification sequences for a plurality of base stations on the assumption that over GF(7), a=3, S0={3, 2, 6, 4, 5, 1} and S1={2, 4, 1, 2, 4, 1}.

TABLE 2

| | | | | | | |
|---|---|---|---|---|---|---|
| $S_0$ | 0 | 0 | 0 | 0 | 0 | 0 |
| $S_1$ | 3 | 2 | 6 | 4 | 5 | 1 |
| $S_2$ | 6 | 4 | 5 | 1 | 3 | 2 |
| $S_3$ | 2 | 6 | 4 | 5 | 1 | 3 |
| $S_4$ | 5 | 1 | 3 | 2 | 6 | 4 |
| $S_5$ | 1 | 3 | 2 | 6 | 4 | 5 |
| $S_6$ | 4 | 5 | 1 | 3 | 2 | 6 |
| $S_7$ | 2 | 4 | 1 | 2 | 4 | 1 |
| $S_8$ | 5 | 6 | 0 | 6 | 2 | 2 |
| $S_9$ | 1 | 1 | 6 | 3 | 0 | 3 |
| $S_{10}$ | 4 | 3 | 5 | 0 | 5 | 4 |
| $S_{11}$ | 0 | 5 | 4 | 4 | 3 | 5 |
| $S_{12}$ | 3 | 0 | 3 | 1 | 1 | 6 |
| $S_{13}$ | 6 | 2 | 2 | 5 | 6 | 0 |

While for Q=7, up to 49 (=$Q^2$) cells $S_0$ to $S_{48}$ can be identifiable, Table 2 illustrates only a part of them for the sake of simplicity.

Table 1 illustrates the subchannel sequences for base station #1 (m=1). A comparison between the subchannel sequences of Table 1 and subchannel sequences #0 of other cells illustrated in Table 2 reveals that, at most, one collision occurs when $c_1$=0 in the cells. For example, between $S_0$ to $S_6$ of Table 2 and the subchannel sequences of Table 1. At most, two collisions occur, for example between $S_7$ to $S_{13}$ of Table 2 and the subchannel sequences of Table 1.

While Equation (5) and Equation (6) are used as the cell identification sequence and the subchannel sequence, respectively, they can be modified to achieve cell identification sequence and subchannel sequence in a different manner. To do so, the cell identification sequence and the subchannel sequence are computed by Equation (7):

$$S'=c_0*S0+\{\beta, \beta, \beta, \ldots, \beta, \beta\}, \beta \in GF(Q)$$

$$S''=S'+c_1*S1 \qquad (7)$$

where S' serves as the cell identification sequence and S" serves as the subchannel sequence. In this case, there may be no difference in the number of collisions between subchannels, compared to the above original method. It should be noted that other methods are also available. In another embodiment of the present invention defined by Equation (7), a subcarrier index is determined by Equation (3) or following Equation (9).

While (Q−1) subcarriers are allocated to each subchannel in the above embodiment, the number of subcarriers per subchannel is not limited to the value. If the number of subcarriers per subchannel is less than (Q−1), associated sequences are truncated to be as short as needed. For example, if the number of subcarriers per subchannel is set to (Q−M), the base sequences S0 and S1 are modified as shown by Equation (8):

$$S0=\{1, a, a^2, a^3, \ldots, a^{(Q-M-1)}\}$$

$$S1=\{1, a^2, a^4, a^6, \ldots, a^{2(Q-M-1)}\}$$

$$(a^m \neq 1 \text{ for } m<Q-1, a^{Q-1}=1) \qquad (8)$$

The first (Q−M) subcarriers of the original sequences are used. In the same manner, if the number of subcarriers per subchannel is set to be larger than (Q−1), as many subcarriers as desired can be achieved by repeating the base sequences. If each subchannel includes 2×(Q−1) subcarriers, the base sequences S0 and S1 occur twice by repetition.

FIG. 3 illustrates allocation of 42 subchannels to 7 subchannels over GF(7). Referring to FIG. 3, two collisions occur between subchannels of cell 2 and cell 3, indicated by a dotted square. Subchannels collide, at most, once between cell 1 and cell 2.

The maximum number of identifiable cells needs to be increased to facilitate base station installation in a wireless communication system with a frequency reuse rate of 1. To do so, subcarriers can be allocated, not for one OFDM symbol, but for a plurality of OFDM symbols. However, this method limits the frame structure by the number of OFDM symbols used for subcarrier allocation.

The present invention can increase the number of symbols as a basic subcarrier allocation unit up to the second power of that possible by conventional methods, when needed.

Given Q(Q−1) subcarriers, if N subcarrier groups are defined using Q×N subcarriers in each OFDM symbol and (Q−1)/N OFDM symbols are used, the subcarrier indexes are computed by Equation (9):

$$\text{Sub\_carrier index}(n,i)=Q*(i-N*\lfloor i/N \rfloor)+S_{m,\beta}(i), n=i/N \qquad (9)$$

In Equation (9), when Q=7 and N=2, the group index i of a subcarrier group 220 ranges from 0 to 5 (i.e. from 0 to Q−2) and the symbol index n is 0 or 1. Here, $\lfloor i/N \rfloor$ represents a maximum integer less than or equal to i/N. The subcarrier index of subchannel #0 for base station #1 is 11 for n=0 and i=3, 13 for n=1 and i=1, and 10 for n=2 and i=0.

Figure 4A:
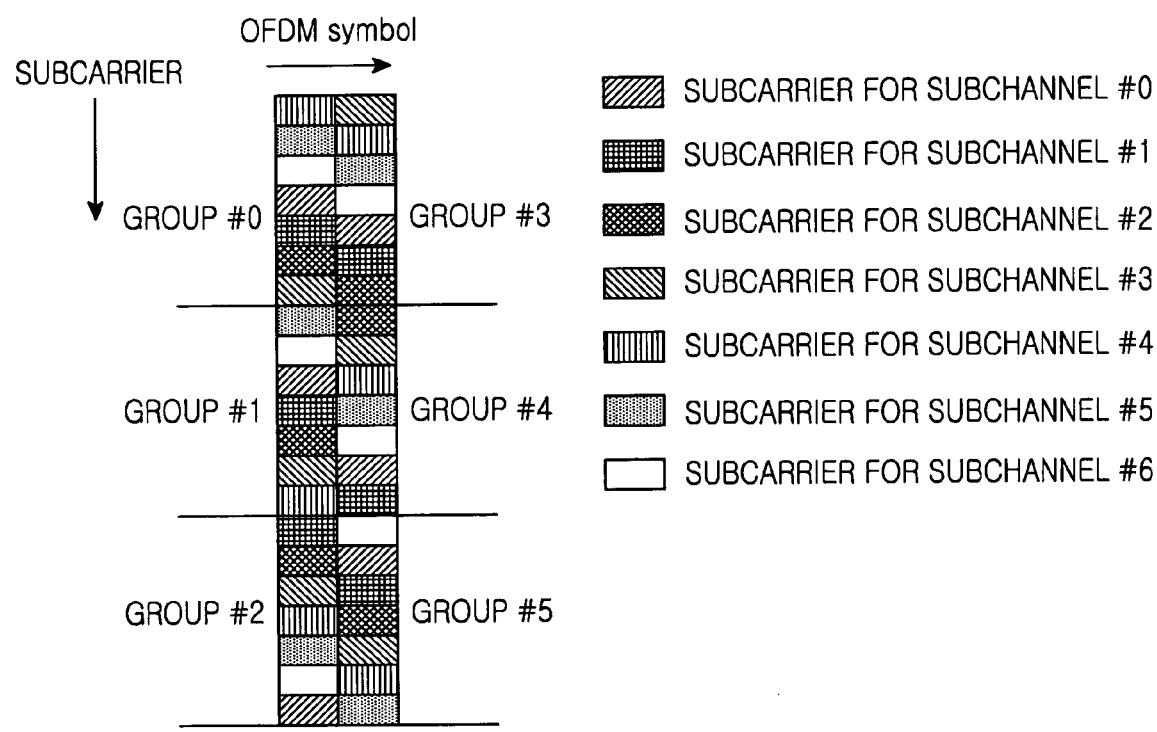
FIGS. 4A and 4B illustrate formation of subchannels over a plurality of symbols, through subcarrier allocation based on subcarrier indexing according to an embodiment of the present invention.
Figure 4B:
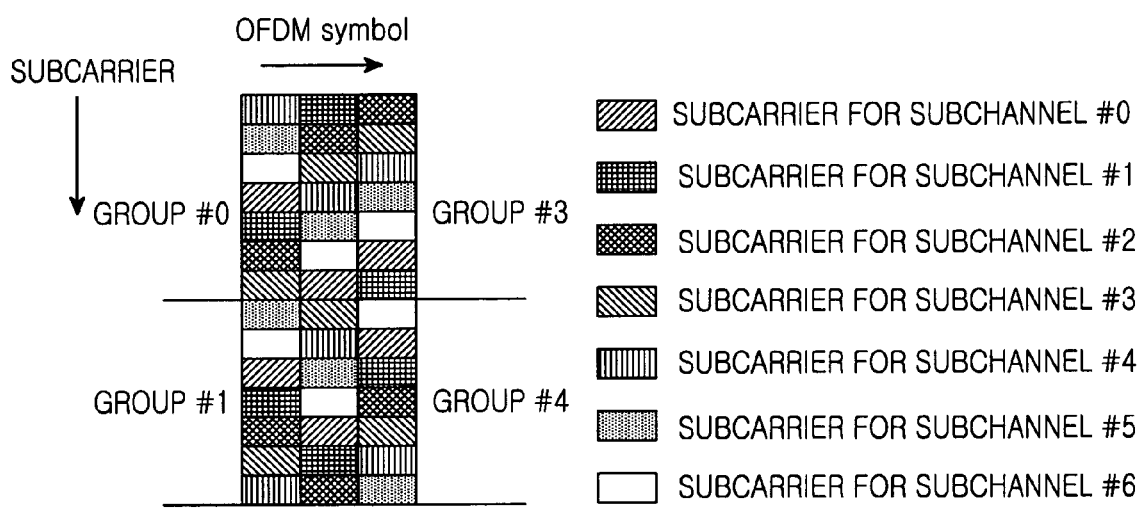

FIGS. 4A and 4B illustrate a method of allocating subcarriers to subchannels according to Eq. (9) when Q=7 and N=2 and 3, respectively.

Subcarrier allocation is performed to carry two symbols in FIG. 4A and three symbols in FIG. 4B. As described earlier, the subcarrier allocation illustrated in FIG. 3 leads to, at most, two subcarrier collisions between different subchannels of different cells. Subchannel indexing based on Equation (9), when using sequences defined over GF(Q), results in no more than one subcarrier collision between subchannels in every Q cells #0 to #(Q−1), #Q to #(2Q−1), and #2Q to #(3Q−1).

In accordance with an embodiment of the present invention, the number of identifiable cells is increased to the second power compared to conventional methods using limited subcarrier resources in an OFDMA communication system. In addition, when as the maximum number of conventionally identifiable cells are kept, cell numbering of the present invention limits the number of inter-subchannel collision occurrences to up to 1 without structural modifications.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of allocating subchannels by a Base Station (BS) in a wireless communication system, comprising the steps of:

allocating, by the BS, A subchannels, each of which including a subcarrier selected from each of B subcarrier groups using cell identification information and C Reed-Solomon sequences, wherein D subcarriers are grouped into the B subcarrier groups, each of the B subcarrier groups including Q successive subcarriers, and each of A, B, C, D and Q being an integer equal to or greater than 1, and further wherein Q is equal to A.

2. The method of claim 1, wherein the cell identification information includes a quotient and a remainder of a division of a cell IDentifier (ID) number (m) by Q.

3. The method of claim 2, wherein indexes of the subcarriers selected from each of the B subcarrier groups which are included in each of the A subchannels are calculated by $$\mathrm{Sub\_carrier}(i)=Q*i+S(i)$$

where the Sub_carrier(i) denotes an index of each of the subcarriers selected from each of the B subcarrier groups, i denotes an index of each of the subcarriers selected from each of the B subcarrier groups when B is Q−1, ranging from 0 to Q−2, and S(i) is an (i+1)th element of the following sequence $S_{m,\beta}$ which is expressed by $$S_{m,\beta}=S_m+\{\beta,\beta,\beta,\ldots,\beta,\beta\}$$

$$\beta\in GF(Q)$$

where GF(Q) represents Galois Field (Q), β is the index of the subchannel ranging from 0 to A−1, and $S_m$ is a cell identification sequence and is calculated by $$S_m=c_0*S0+c_1*S1$$

where each of $c_0$ and $c_1$ is one of the quotient and the remainder and each of S0 and S1 is one of C Reed-Solomon sequences.

4. The method of claim 3, wherein the S0 and S1 are expressed by $$S0=\{1, a, a^2, a^3, \ldots, a^{Q-2}\}$$

$$S1=\{1, a^2, a^4, a^6, \ldots, a^{2(Q-2)}\}$$

($a^m \neq 1$ for m<Q−1)

where a is a primitive element of GF(Q).

5. The method of claim 4, wherein equivalent sequences of the S0 and S1 are generated by cyclically shifting S0 and S1.

6. The method of claim 4, wherein B is equal to (Q−1), and increases and decreases.

7. The method of claim 2, wherein if the number of the entire subcarriers of the wireless communication system is Q(Q−1), N subcarrier groups are defined using Q*N subcarriers in each symbol, (Q−1)/N symbols are used and N is equal to B, then indexes of the subcarriers selected from each of the B subcarrier groups which are included in each of the A subchannels are calculated by $$\mathrm{Sub\_carrier\ index}\ (n;i)=Q*(i-N*\lfloor i/N\rfloor)+S_{m,\beta}(i), n=i/N$$

where $\lfloor i/N\rfloor$ represents a maximum integer less than or equal to i/N, the Sub_carrier index(n;i) denotes an index of each of the entire subcarriers, n denotes a symbol index, i denotes an index of each of the subcarriers selected from each of the B subcarrier groups, ranging from 0 to N−1, and the following sequence $S_{m,\beta}$ is expressed by $$S_{m,\beta}=S_m+\{\beta,\beta,\beta,\ldots,\beta,\beta\}$$

$$\beta\in GF(Q)$$

where GF(Q) represents Galois Field (Q), β is the index of the subchannel ranging from 0 to A−1, and $S_m$ is a cell identification sequence and is calculated by $$S_m=c_0*S0+c_1*S1$$

where each of $c_0$ and $c_1$ is one of the quotient and the remainder and each of S0 and S1 is one of a plurality of C Reed-Solomon sequences.

8. The method of claim 7, wherein the S0 and S1 are expressed by $$S0=\{1, a, a^2, a^3, \ldots, a^{Q-2}\}$$

$$S1=\{1, a^2, a^4, a^6, \ldots, a^{2(Q-2)}\}$$

($a^m \neq 1$ for m<Q−1)

where a is a primitive element of GF(Q).

9. The method of claim 8, wherein equivalent sequences of S0 and S1 are generated by cyclically shifting S0 and S1.

10. The method of claim 8, wherein B is equal to (Q−1), and increases and decreases.

11. The method of claim 2, wherein the allocating step comprises calculating indexes of the subcarriers selected from each of the B subcarrier groups which are with included in each of the A subchannels by $$\mathrm{Sub\_carrier}(i)=Q*i+S''(i)$$

where Sub_carrier(i) denotes an index of each of the subcarriers selected from each of the B subcarrier groups, i denotes an index of each of B subcarrier groups, ranging from 0 to B−1, and S''(i) is an (i+1)th element of the following sequence S'' which is expressed by $$S'=c_0*S0+\{\beta,\beta,\beta,\ldots,\beta,\beta\}, \beta\in GF(Q)$$

$$S''=S'+c_1*S1$$

where S' is a sequence for a cell identification, S'' is a sequence representing β th subchannel of a cell having the cell ID number m, GF(Q) represents Galois Field, each of $c_0$ and $c_1$ are one of the quotient and the remainder and each of S0 and S1 is one of a plurality of C Reed-Solomon sequences expressed by $$S0=\{1, a, a^2, a^3, \ldots, a^{Q-2}\}$$

$$S1=\{1, a^2, a^4, a^6, \ldots, a^{2(Q-2)}\}$$

($a^m \neq 1$ for m<Q−1)

where a is a primitive element of GF(Q).

12. The method of claim 11, wherein equivalent sequences of S0 and S1 are generated by cyclically shifting S0 and S1.

13. The method of claim 11, wherein B is equal to (Q−1), and increases and decreases.

14. The method of claim 2, wherein if (Q−M) subcarriers are allocated to each of A subchannels, then indexes of (Q−M) subcarriers which are included each of the A subchannels are calculated by $$\mathrm{Sub\_carrier}(i)=Q*i+S(i)$$

where (Q−M) subcarriers indicates that the number of subcarriers per channel is less than (Q−1), the Sub_carrier(i) denotes an index of each of the (Q−M) subcarriers, i denotes an index of each of the subcarrier groups when B is equal to (Q−M), ranging from 0 to (Q−M)−1, and S(i) is an (i+1)th element of the following sequence $S_{m,\beta}$ which is expressed by $$S_{m,\beta}=S_m+\{\beta, \beta, \beta, \ldots, \beta, \beta\}$$

$$\beta \in GF(Q)$$

where GF(Q) represents Galois Field, β is the index of the subchannel ranging from 0 to A−1, and $S_m$ is a cell identification sequence and is calculated by $$S_m=c_0*S0+c_1*S1$$

where each of $c_0$ and $c_1$ is one of the quotient and the remainder and each of S0 and S1 is one of a plurality of C Reed-Solomon sequences.

15. The method of claim 14, wherein the S0 and S1 are expressed by $$S0=\{1, a, a^2, a^3, \ldots, a^{Q-2}\}$$

$$S1=\{1, a^2, a^4, a^6, \ldots, a^{2(Q-2)}\}$$

$$(a^m \neq 1 \text{ for } m<Q-1)$$

where a is a primitive element of GF(Q).

16. The method of claim 15, wherein equivalent sequences of S0 and S1 are generated by cyclically shifting S0 and S1.

17. The method of claim 15, wherein B is equal to (Q−1), and increases and decreases.

18. An apparatus for allocating subchannels in a wireless communication system, comprising:
a subcarrier allocator for allocating A subchannels, each of the A subchannels including a subcarrier selected from each of B subcarrier groups using cell identification information and C Reed-Solomon sequences,
wherein D subcarriers are grouped into the B subcarrier groups, each of the B subcarrier groups including Q successive subcarriers, and each of A, B, C, D and Q being an integer equal to or greater than 1, and further wherein Q is equal to A.

19. The apparatus of claim 18, wherein the cell identification information includes a quotient and a remainder of a division of a cell IDentifier (ID) number (m) by Q.

20. The apparatus of claim 19, wherein indexes of the subcarriers selected from each of the B subcarrier groups which are included each of the A subchannels are calculated by $$\text{Sub\_carrier}(i)=Q*i+S(i)$$

where the Sub_carrier (i) denotes an index of each of the subcarriers selected from each of the B subcarrier groups, i denotes an index of each of the subcarriers selected from each of the B subcarrier groups when B is Q−1, ranging from 0 to Q−2, and S(i) is an (i+1)th element of the following sequence $S_{m,\beta}$ which is expressed by $$S_{m,\beta}=S_m+\{\beta, \beta, \beta, \ldots, \beta, \beta\}$$

$$\beta \in GF(Q)$$

where GF(Q) represents Galois Field, β is the index of the subchannel ranging from 0 to A−1, and $S_m$ is the cell identification sequence and is calculated by $$S_m=c_0*S0+c_1*S1$$

where each of $c_0$ and $c_1$ is one of the quotient and the remainder and each of S0 and S1 is one of a plurality of C Reed-Solomon sequences.

21. The apparatus of claim 20, wherein S0 and S1 are expressed by $$S0=\{1, a, a^2, a^3, \ldots, a^{Q-2}\}$$

$$S1=\{1, a^2, a^4, a^6, \ldots, a^{2(Q-2)}\}$$

$$(a^m \neq 1 \text{ for } m<Q-1)$$

where a is a primitive element of GF(Q).

22. The apparatus of claim 21, wherein equivalent sequences of S0 and S1 are generated by cyclically shifting S0 and S1.

23. The apparatus of claim 21, wherein B is equal to (Q−1), and increases and decreases.

24. The apparatus of claim 19, wherein if the number of the entire subcarriers of the wireless communication system is Q(Q−1), N subcarrier groups are defined using Q*N subcarriers in each symbol, (Q−1)/N symbols are used, and N is equal to B, then indexes of the subcarriers selected from each of the B subcarrier groups which are included in each of the A subchannels are calculated by $$\text{Sub\_carrier index}(n;i)=Q*(i-N*\lfloor i/N \rfloor)+S_{m,\beta}(i), n=i/N$$

where $\lfloor i/N \rfloor$ represents a maximum integer less than or equal to i/N, the Sub_carrier index(n;i) denotes an index of each of the subcarriers, n denotes a symbol index, i denotes an index of each of the B subcarrier groups, ranging from 0 to N−1, and the following sequence $S_{m,\beta}$ is expressed by $$S_{m,\beta}=S_m+\{\beta, \beta, \beta, \ldots, \beta, \beta\}$$

$$\beta \in GF(Q)$$

where GF(Q) represents Galois Field (Q), β is the index of the subchannel ranging from 0 to A−1, and $S_m$ is a cell identification sequence and is calculated by $$S_m=c_0*S0+c_1*S1$$

where each of $c_0$ and $c_1$ is one of the quotient and the remainder and each of S0 and S1 is one of a plurality of C Reed-Solomon sequences.

25. The apparatus of claim 24, wherein the S0 and S1 are expressed by $$S0=\{1, a, a^2, a^3, \ldots, a^{Q-2}\}$$

$$S1=\{1, a^2, a^4, a^6, \ldots, a^{2(Q-2)}\}$$

$$(a^m \neq 1 \text{ for } m<Q-1)$$

where a is a primitive element of GF(Q).

26. The apparatus of claim 25, wherein equivalent sequences of S0 and S1 are generated by cyclically shifting S0 and S1.

27. The apparatus of claim 25, wherein B is equal to (Q−1), and increases and decreases.

28. The apparatus of claim 19, wherein indexes of the subcarriers selected from each of the B subcarrier groups which are included each of the A subchannels are calculated by $$\text{Sub\_carrier}(i)=Q*i+S''(i)$$

where Sub_carrier(i) denotes an index of each of the subcarriers selected from each of the B subcarrier groups, i denotes an index of each of the B subcarrier groups, ranging from 0 to B−1, and S''(i) is an (i+1)th element of the following sequence S'' which is calculated by $$S'=c_0*S0+\{\beta, \beta, \beta, \ldots, \beta, \beta\}, \beta \in GF(Q)$$

$$S''=S'c_1*S1$$

where GF(Q) represents Galois Field (Q), S' is a sequence for a cell identification, S" is a sequence representing a βth subchannel of a cell having the cell ID number m, each of $c_0$ and $c_1$ is one of the quotient and the remainder and each of S0 and S1 is one of a plurality of C Reed-Solomon sequences expressed by $$S0=\{1, a, a^2, a^3, \ldots, a^{Q-2}\}$$

$$S1=\{1, a^2, a^4, a^6, \ldots, a^{2(Q-2)}\}$$

($a^m \neq 1$ for m<Q−1)

where a is a primitive element of GF(Q).

29. The apparatus of claim 28, wherein equivalent sequences of the S0 and S1 are generated by cyclically shifting S0 and S1.

30. The apparatus of claim 28, wherein B is equal to (Q−1), and increases and decreases.

31. The apparatus of claim 19, wherein if (Q−M) subcarriers are allocated to each of A subchannels, subcarriers which are included in each of A subchannels are calculated by $$\text{Sub\_carrier}(i) = Q*i + S(i)$$

where (Q−M) subcarriers indicates that the number of subcarriers per channel is less than (Q−1), the Sub_carrier(i) denotes an index of each of the (Q−M) subcarriers, i denotes an index of each of (Q−M) subcarrier groups when B is equal to (Q−M), ranging from 0 to (Q−M)−1, and S(i) is an (i+1)th element of the following sequence $S_{m,\beta}$ which is expressed by $$S_{m,\beta} = S_m + \{\beta, \beta, \beta, \ldots, \beta, \beta\}$$

$$\beta \in GF(Q)$$

where GF(Q) represents Galois Field, β is the index of the subchannel ranging from 0 to A−1, and $S_m$ is a cell identification sequence and is calculated by $$S_m = c_0 * S0 + c_1 * S1$$

where each of $c_0$ and $c_1$ is one of the quotient and the remainder and each of S0 and S1 is one of a plurality of Reed-Solomon sequences expressed by $$S0=\{1, a, a^2, a^3, \ldots, a^{Q-2}\}$$

$$S1=\{1, a^2, a^4, a^6, \ldots, a^{2(Q-2)}\}$$

($a^m \neq 1$ for m<Q−1)

where a is a primitive element of GF(Q).

32. The apparatus of claim 31, wherein equivalent sequences of S0 and S1 are generated by cyclically shifting S0 and S1.

33. The apparatus of claim 31, wherein B is equal to (Q−1) and increases and decreases.

* * * * *